United States Patent Office 3,226,443
Patented Dec. 28, 1965

3,226,443
CARBONYL COMPOUNDS CONTAINING A
HINDERED PHENOL GROUP
Eric A. Meier, Jackson Heights, and Martin Dexter, White
Plains, N.Y., assignors to Geigy Chemical Corporation,
Greenburgh, N.Y., a corporation of Delaware
No Drawing. Original application Jan. 5, 1962, Ser. No.
164,619. Divided and this application Apr. 12, 1963,
Ser. No. 276,686
3 Claims. (Cl. 260—590)

This is a division of Serial No. 164,619, filed January 5, 1962.

This invention relates to a novel and useful process for the preparation of certain 3,5-dialkyl-4-hydroxyphenyl organic compounds. In particular, the invention concerns the preparation of compounds of the Formula I:

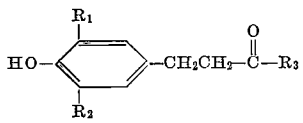

wherein $R_1$ is a secondary or a tertiary alkyl group, preferably the tertiary (t or tert.) butyl group; other groups possible are, e.g. the iopropyl group, secondary (sec.) or tert. alkyl groups of 4 to 24 carbon atoms: butyl, amyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, etc., $R_2$ is an alkyl group, preferably the tertiary butyl group; other groups possible are alkyl groups of 1 to 24 carbon atoms: methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, etc., $R_3$ is alkyl of from 1 to 24 carbon atoms.

The 3,5-dialkyl-4-hydroxyphenyl substituted organic compounds of the Formula I are used as stabilizers for organic material normally subject to deterioration caused by heat, light oxygen, ozone, and other physical and/or chemical forces tending to cause degradation, embrittlement, gum or sludge formation, discoloration and other undesirable effects in a variety of organic materials, e.g. lubricating oils and fuel oils, and in general, oils of mineral, vegetable or animal origin, waxes, soaps, greases, gasolines, natural and synthetic rubbers, resins and plastics, such as polymers of hydrocarbons, e.g. ethylene and propylene, etc.

An object of this invention is to provide a novel chemical process for preparing the compounds of the Formula I. A further object is to provide a process which comprises contacting a 3,5-dialkyl-4-hydroxybenzene compound, suitable to yield a derivative of the Formula I above, with an appropriate compound of the Formula III (hereinbelow) in the presence of a base catalyst and a solvent, such as a difficulty esterifiable alcohol, to yield the desired organic compound of the Formula I. The difficulty esterifiable alcohol is preferably a lower alkanol, especially a tertiary lower alkanol, e.g. t-butanol, t-pentanol, t-hexanol, t-heptanol, t-octanol. In this specification "lower" alkanols have up to 8 carbon atoms. Other objects of this invention will be apparent from the description and specification which follows.

It has now surprisingly been found that the foregoing objects of the invention are realized by the process which comprises reacting a compound of the Formula II:

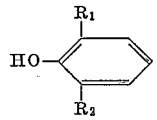

wherein $R_1$ and $R_2$ are defined as hereinabove, with a further compound of the Formula III:

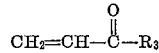

wherein $R_3$ is as above defined, the reaction to be carried out in the presence of a base catalyst such as a quaternary ammonium base, e.g. benzyltrimethylammonium methoxide or such as alkali metal amides, e.g. sodamide, or alkali metal alkoxides—preferably an alkali metal lower alkoxide, e.g. sodium or potassium methoxide, ethoxide, n-propoxide, isopropoxide, n-butoxide, sec-butoxide, t-butoxide, pentoxide, hexoxide, heptoxide, octyloxide, etc., or alkali metal hydroxides, e.g. sodium or potassium hydroxide. The alkaline earth metal alkoxides or hydroxides are also useful.

The compounds II and III and the base catalyst are reacted in a suitable solvent which can be either one of the reacting compounds II or III which may or may not be present in equimolar amounts, or an auxiliary solvent which may be an aliphatic alcohol, preferably a difficultly esterifiable alcohol such as a tertiary alkanol, e.g. tertiary butanol, or an ether type solvent such as tetrahydrofuran, or a suitable amide such as dimethyl formamide, or a suitable ketone, such as acetone.

Compounds of the Formula II are prepared by alkylation of phenol and by other known methods. Certain compounds of the Formula II are available commercially, e.g. 2,6-di-tert.-butylphenol. Examples of compounds of the Formula II which are useful are the following: 6-t-butyl-o-cresol, 6-(1,1,3,3-tetramethylbutyl)-o-cresol, 2-sec-butyl-6-t-butylphenol, 2,6-bis(1,1-dimethyl-n-propyl)phenol, 2,6-bis(1-methyl-n-nonyl)phenol, 2-(1,1,3,3-tetramethyl-n-butyl)-6-methylphenol, etc.

A wide range of temperatures from 25° C. (at atmospheric pressure) to 200° C. (at elevated pressures) may be employed to bring about the desired addition. The preferred range of temperatures is 40° to 110° C.

The reaction may be conducted at 1:1 molar concentrations of the two reactants II and III. Large excesses of the activated olefin III should be avoided in order to prevent side reactions.

Any suitable catalyst concentrations, e.g. from 0.01 to 100 mole percent, based on the phenol (II) concentration, may be employed, though preferred are mole percents of 5 to 25%.

Any suitable mode of addition may be employed although it has been found most practical to add the activated olefin in III last to prevent its homopolymerization particularly at elevated temperatures.

Optimum results are obtained when air or oxygen is excluded or substantially reduced in amount from the atmosphere immediately in contact with the reactants. This can be accomplished in various ways, e.g. by blanketing the reactants in the reaction vessel with an inert gas such as nitrogen. Alternatively, a reaction vessel is chosen whereby the reactants, solvent, catalyst, etc. substantially fill the vessel. In a reaction in a closed vessel, air may be swept out with an inert gas such as nitrogen before introducing the reactants, etc. into the reaction vessel.

In another aspect of this invention, it has now been found that the novel compounds of the Formula I are useful stabilizers for unstable organic material, e.g. hydrocarbon oils, lubricating and fuel oils, plastic materials such as polypropylene and polyethylene, etc. as described hereinabove.

The following example illustrates the invention but is not meant to limit the same thereto; in said example, unless otherwise indicated, parts are by weight and the relationship between parts by weight and parts by volume is as that of grams to cubic centimeters; temperatures are in degrees centigrade.

EXAMPLE

*4-(3′,5′-di-tertiary butyl-4′-hydroxyphenyl)butan-2-one*

To a solution prepared by reacting 1.2 parts of potassium metal with 250 parts by volume of tertiary butyl alcohol is added 46.6 parts of 2,6-di-tertiary butyl phenol. To this stirred solution is added dropwise 26.8 parts of methyl vinyl ketone at such a rate as to keep the temperature below 65°. After addition is complete the reaction mass is heated at 50° for 16 hours and then allowed to cool to room temperature. The excess methyl vinyl ketone and solvent are distilled off under reduced pressure. The residue is neutralized with very dilute hydrochloric acid and extracted with two times 200 parts by volume portions of ether. The combined ethereal layers are washed with 2 times 100 parts by volume portions of water. The ethereal layer is then dried over anhydrous sodium sulfate and then concentrated on the steam bath. The residual mass is then vacuum distilled collecting the fraction boiling from 137–139°/0.05 mm. Hg pressure. On prolonged standing the product 4-(3′,5′-di-tertiary butyl-4′-hydroxyphenyl)butan-2-one crystallizes.

If in this example, 109 parts of octadecyl vinyl ketone are substituted for 26.8 parts of methyl vinyl ketone, then there is obtained β-(3,5-di-tertiarybutyl-4-hydroxyphenyl)-ethyl octadecyl ketone. Other substituted ethyl alkyl ketones are prepared in a similar way when the respective alkyl vinyl ketone is employed: ethyl, propyl, butyl, amyl, hexyl, heptyl, octyl, nonyl, decyl, undecyl, dodecyl, tridecyl, tetradecyl, pentadecyl, hexadecyl, heptadecyl, nonadecyl, eicosyl, docosyl, tricosyl, tetracosyl, etc.

What is claimed is:

1. A compound of the formula:

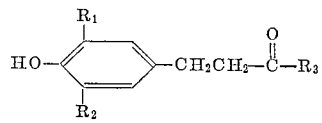

wherein
   $R_1$ is a member selected from the group consisting of secondary and tertiary lower alkyl groups,
   $R_2$ is lower alkyl, and
   $R_3$ is alkyl.

2. 4-(3′,5′-di-tertiary butyl-4′-hydroxyphenyl)butan-2-one.

3. β-(3,5-di-tertiary butyl-4-hydroxyphenyl)ethyl octadecyl ketone.

References Cited by the Examiner

UNITED STATES PATENTS 3,098,847   7/1963   Porsch et al. _____ 260—590

LEON ZITVER, *Primary Examiner.*

DANIEL D. HORWITZ, *Examiner.*